United States Patent
Hendrix

(10) Patent No.: US 11,297,844 B2
(45) Date of Patent: Apr. 12, 2022

(54) CARCASS HANGING DEVICE AND METHOD FOR HANGING AN ANIMAL CARCASS

(71) Applicant: NSC Beef Processing, LLC, Baird, TX (US)

(72) Inventor: Gary Steven Hendrix, Abilene, TX (US)

( * ) Notice: Subject to any disclaimer, the term of this patent is extended or adjusted under 35 U.S.C. 154(b) by 0 days.

(21) Appl. No.: 16/945,980

(22) Filed: Aug. 3, 2020

(65) Prior Publication Data

US 2022/0030891 A1 Feb. 3, 2022

(51) Int. Cl.
A22C 15/00 (2006.01)
A22C 17/02 (2006.01)

(52) U.S. Cl.
CPC .............. *A22C 15/00* (2013.01); *A22C 17/02* (2013.01)

(58) Field of Classification Search
CPC ......... A22C 15/00; A22C 17/00; A22C 17/02; A22C 17/0093
USPC ................................ 452/185, 187–192, 197
See application file for complete search history.

(56) References Cited

U.S. PATENT DOCUMENTS

| | | | | |
|---|---|---|---|---|
| 1,172,489 A | * | 2/1916 | Schellinger | A22B 5/06 452/189 |
| 1,624,320 A | * | 4/1927 | Demmer | A22B 5/06 452/189 |
| 1,863,743 A | * | 6/1932 | Burns | A22C 15/003 452/187 |
| 2,438,608 A | * | 3/1948 | Johnson | A22C 21/0007 452/188 |
| 2,485,929 A | * | 10/1949 | Siegrist | A61D 3/00 119/716 |
| 2,505,159 A | * | 4/1950 | Teague | A22C 15/003 211/113 |
| 2,697,246 A | * | 12/1954 | Zebarth | A22C 21/0007 452/188 |
| 2,731,665 A | * | 1/1956 | Zebarth | A22C 21/0007 452/188 |
| 2,739,247 A | * | 3/1956 | Sharp et al. | F02N 11/08 290/38 C |
| 3,210,802 A | * | 10/1965 | Gray | A22B 5/0029 452/149 |
| 4,413,376 A | * | 11/1983 | Linville | B65G 47/61 198/678.1 |
| 5,482,501 A | * | 1/1996 | Frits | A22B 5/161 452/125 |
| 6,264,544 B1 | * | 7/2001 | Mullins | A22B 5/06 177/126 |
| 6,974,374 B1 | * | 12/2005 | Teinert | A22B 5/06 452/191 |

(Continued)

*Primary Examiner* — Richard T Price, Jr.
(74) *Attorney, Agent, or Firm* — Laubscher & Laubscher, P.C.

(57) ABSTRACT

An animal carcass hanging device includes a base having an upper surface, a projection connected at one end with the base upper surface, and a connection device connected with a second end of the projection. The projection has a width that is less than a width of the base. When the device is inserted into a central cavity of an animal carcass, the projection extends through a carcass upper end opening so that the base is in contact with a wall of the cavity. The connection device is then connected with a structure and the carcass is hung from its front quarter.

12 Claims, 5 Drawing Sheets

(56) References Cited

U.S. PATENT DOCUMENTS

| | | | | |
|---|---|---|---|---|
| 7,023,844 | B2* | 4/2006 | Wolrich | H04L 49/10 370/364 |
| 7,125,331 | B1* | 10/2006 | Sayers | A22B 5/06 452/189 |
| 7,588,490 | B1* | 9/2009 | Warner | A22B 5/06 452/197 |
| 7,874,531 | B1* | 1/2011 | Walden | A22B 5/06 248/176.1 |
| 7,922,568 | B1* | 4/2011 | Byrd | A22B 5/06 452/197 |
| 2007/0184768 | A1* | 8/2007 | Sorensen | A22C 21/0007 452/189 |
| 2008/0039003 | A1* | 2/2008 | Peitz | A22B 7/006 452/187 |
| 2010/0317275 | A1* | 12/2010 | Carbaugh | A22B 5/06 452/197 |
| 2015/0065021 | A1* | 3/2015 | Kirschbaum | A22B 7/002 452/187 |

* cited by examiner

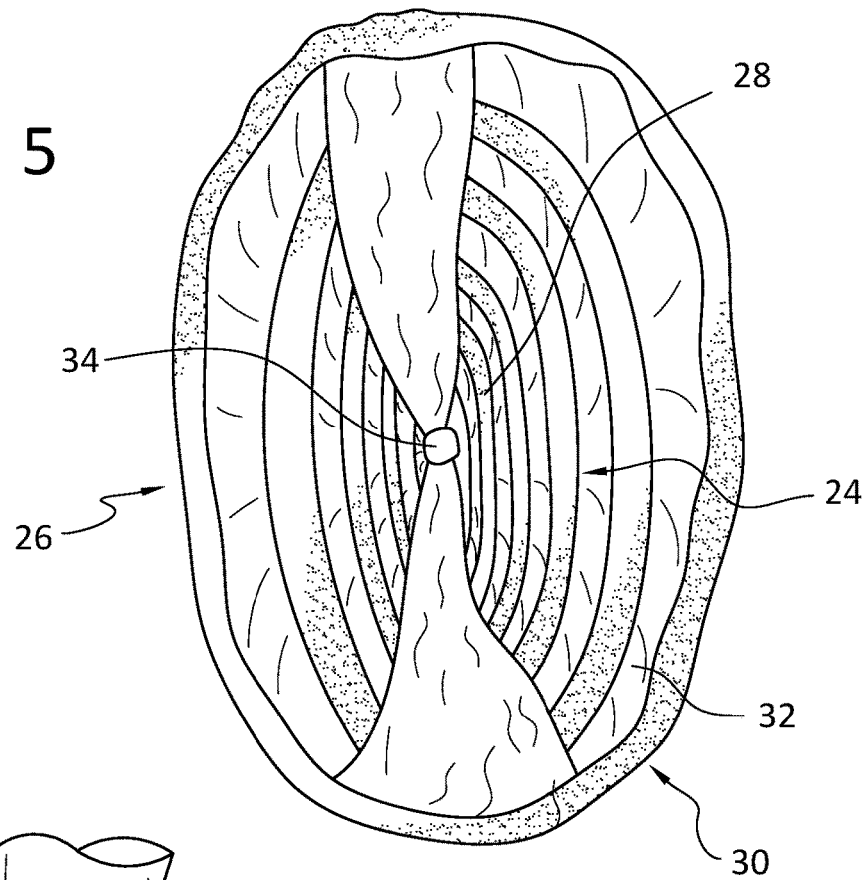
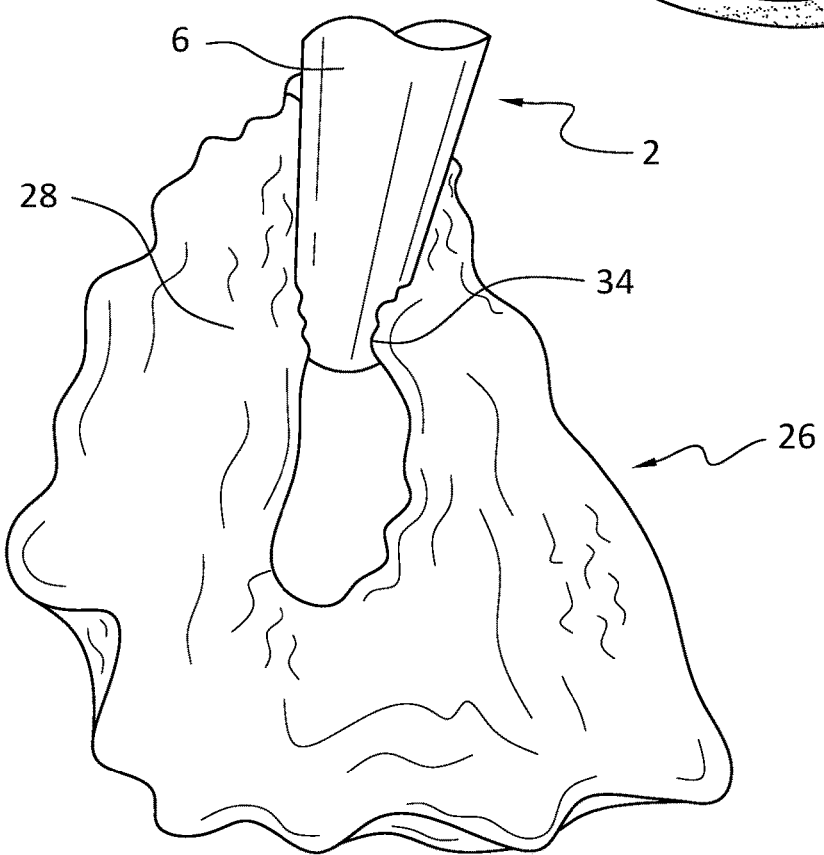

CARCASS HANGING DEVICE AND METHOD FOR HANGING AN ANIMAL CARCASS

BACKGROUND OF THE DISCLOSURE

The present disclosure relates generally to a device and method for hanging an animal carcass, and more specifically to a device and method for hanging an animal carcass from its front quarter.

Most methods of butchering involve hanging an animal carcass vertically by its two rear limbs and cutting the breastbone to remove internal organs. The carcass is then split along the backbone, splitting the beef in half, which makes it easier to handle the carcass. However, this causes meat contamination through spinal cord exposure and requires an extended cooling period that increases the total time needed for butchering. Further, butchering cooled meat can increase instances of injury to butchers.

To overcome these drawbacks, a new apparatus for butchering an animal carcass has been developed which does not require splitting the carcass and does not require that the carcass be cooled. That apparatus is disclosed in U.S. patent application Ser. No. 16/774,753, which is incorporated herein by reference. It includes a pair of spreading plates on which an animal carcass is arranged such that the front quarter of the carcass is aligned above its hindquarter. However, the known methods and apparatuses currently used to hang an animal carcass are not suitable for use with the spreading plate apparatus. Thus, there is a need for a device and method for hanging an animal carcass by its front quarter, whether for use with the above-noted apparatus or with other butchering methods.

SUMMARY OF THE DISCLOSURE

Accordingly, it is an object of the present disclosure to provide an animal carcass hanging device for hanging a beef carcass by its front quarter for butchering. The device could also be used with similar carcasses of hogs, pigs, sheep, goats, and deer, to name a few. The carcass hanging device has a base, at least one projection connected with the base, and a connection device connected with the projection. The base has an axis and a generally circular configuration. The projection is connected with the base at a first end. When the carcass hanging device is inserted into a central cavity of a carcass that contains an opening at its front quarter, the connection device extends through the opening, the base contacts a central cavity wall, and the connection device is connected with a structure to hang the carcass from its front quarter.

In a first embodiment, the carcass hanging device includes a base having an upper surface, a projection connected at one end with the base upper surface, and a connection device connected with a second end of the projection. The projection has a width that is less than a width of the base, and the connection device preferably includes a chain connected with its second end.

Preferably, the carcass hanging device of the first embodiment further includes at least one vertical support wall having a first edge connected with the base upper surface and a second edge connected with a surface of the projection. The vertical support wall preferably has a triangular configuration.

In a second embodiment, the base has an annular configuration and contains a central opening. Three projections are provided, each having a first end connected in spaced relation with the base and extending at an angle from the base toward a common location on the base axis. The hanging device forms a generally cone-shaped configuration. Preferably, the base has a circular configuration in a vertical cross section.

It is also an object of the present disclosure to provide a method for hanging an animal carcass, including the steps of providing a carcass hanging device, attaching the device with a carcass front quarter, connecting the device with a structure, and hanging the carcass from its front quarter to position the front quarter above the carcass hindquarter. Preferably, the carcass hanging device includes a base having an upper surface, a projection connected with the upper surface at a first end, and a connection device connected with a second end of the projection. The device is inserted into a cavity of a carcass and a portion of the device extends through a front quarter opening.

BRIEF DESCRIPTION OF THE FIGURES

Other objects and advantages of the disclosure will become apparent from a study of the following specification when viewed in the light of the accompanying drawing, in which:

FIG. 5 is a bottom view of a central cavity of a beef carcass;

FIG. 6 is a top perspective view of a hanging device extending through an opening in the front quarter of a beef carcass;

DETAILED DESCRIPTION

The present disclosure relates to a device and method for hanging an animal carcass by its front quarter. The device and method disclosed herein are described at times in reference to use with beef and/or a cow. It will be understood by those with skill in the art that the device and method can also be used in the processing application of other animals, for instance with hogs, pigs, sheep, goats, and deer.

Figure 1:
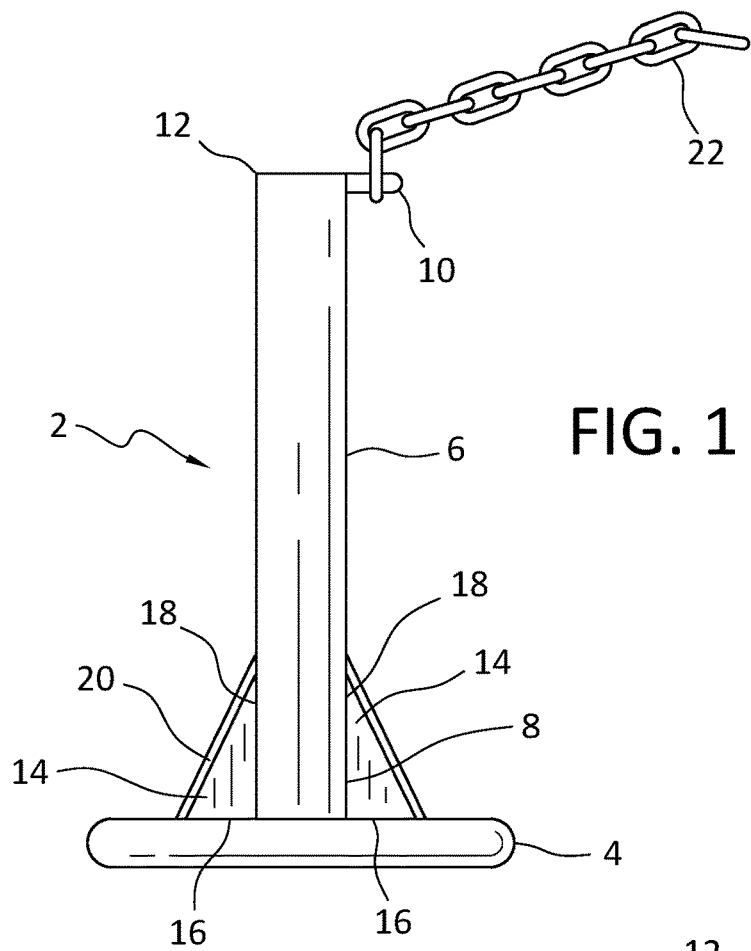
FIG. 1 is a front view of a first embodiment of a hanging device according to the present disclosure.
Figure 2:
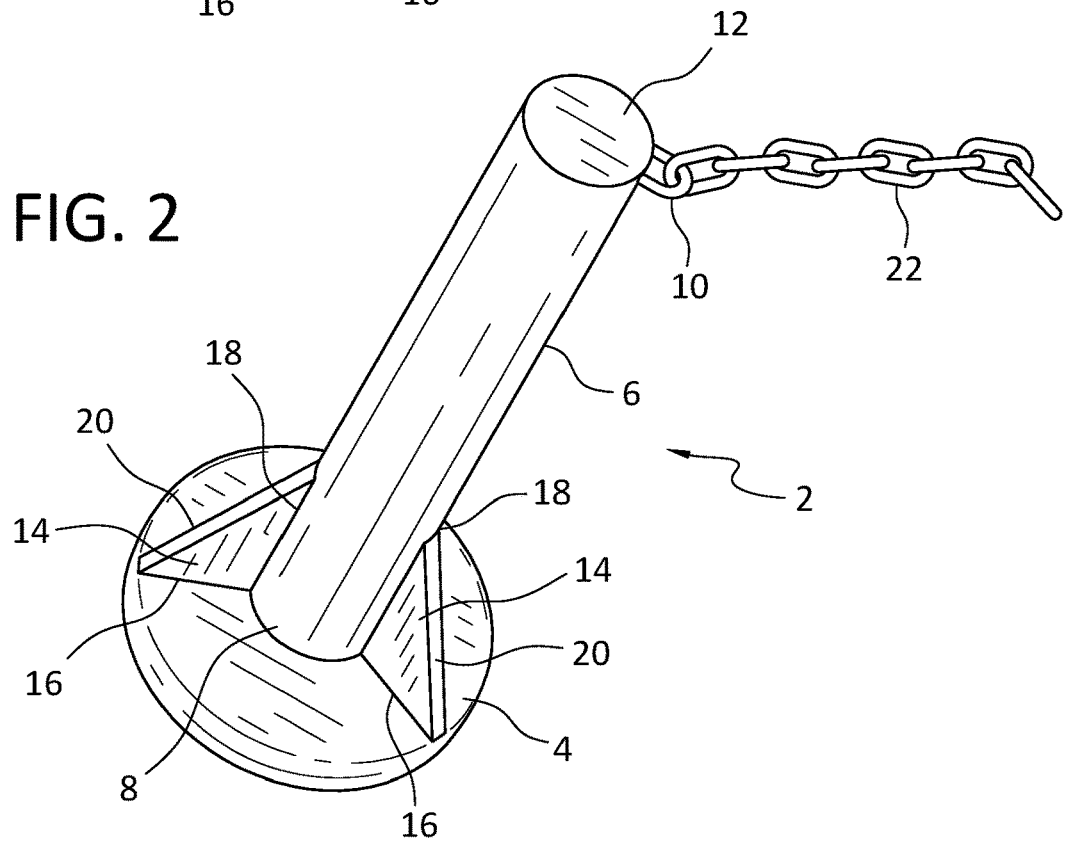
FIG. 2 is a perspective view of the embodiment shown in FIG. 1.

Referring to FIGS. 1 and 2, there is shown a carcass hanging device 2 which includes a base 4, a stem or projection 6 connected with an upper surface of the base at its lower end 8, and a connection device 10 connected with a projection upper end 12. The upper end of the projection is preferably closed to provide increased rigidity and stability to the device, though it is possible to provide a device with a projection that is open at its upper end without deviating from the purpose and function of the device.

The device further includes support walls 14 that have a lower edge 16 connected with the base 4 and a side edge 18 connected with the projection. A free edge 20 of each wall is angled to provide additional contact with the central cavity wall of a beef carcass, as discussed in detail below.

There is also a chain 22 connected with the connection device 10 which is used to hang the device, and in turn a beef carcass, from a support structure. Preferably, the base and projection have circular and cylindrical configurations, respectively. It will be understood by those skilled in the art, however, that a horizontal cross section of the base and projection could form various shapes, such as a triangle, square, or any other polygon.

Figure 3:
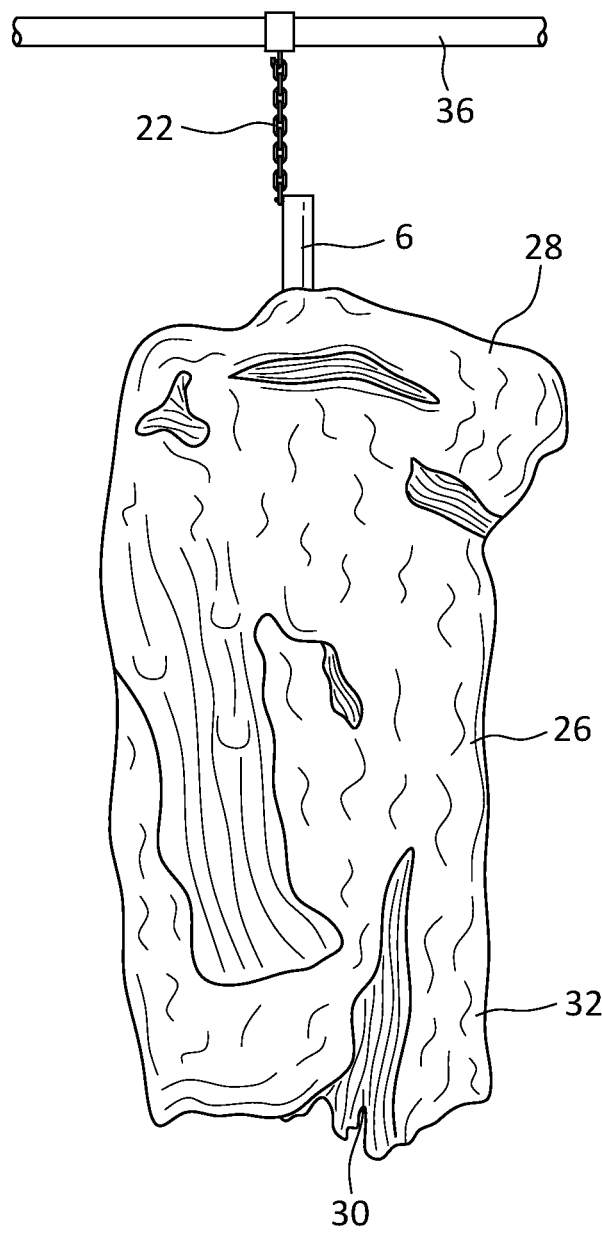
FIGS. 3 and 4 are front and detailed partial front views, respectively, of the embodiment of FIGS. 1 and 2 with an animal carcass hanging therefrom.
Figure 4:
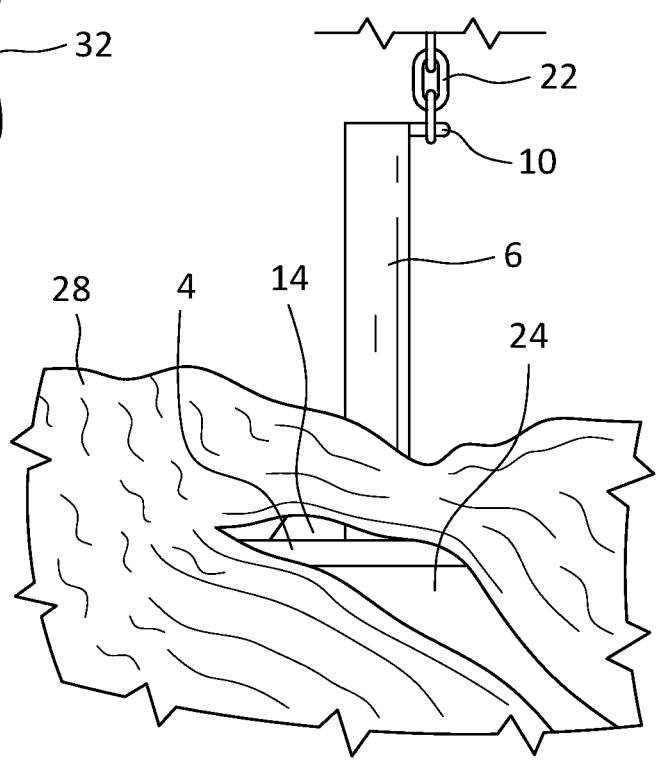

FIGS. 3-6 show the manner in which the hanging device 2 is used with a beef carcass. Referring first to FIGS. 3, 4 and 6, the hanging device 2 is inserted into a central cavity 24 of a beef carcass 26 with the projection 6 extending through the carcass at its front quarter 28. As shown in FIG. 5, a standard beef carcass has a rear opening 30 at its hindquarter 32 and a front opening 34 at its front quarter 28. The device 2 enters the carcass central cavity 24 through the hindquarter opening 30 and is positioned toward the front quarter opening such that the projection 6 extends through the front quarter opening 34 as shown in FIGS. 3, 4 and 6. The opening shown in FIGS. 5 and 6 is the result of removing the head of the carcass. Alternative openings in the front quarter 28 through which the projection 6 extends could be used.

As shown in FIGS. 3 and 4, once the hanging device 2 is inserted into the central cavity 24 and the projection 6 extends through the front quarter opening 34, the chain 22 is connected with a support beam 36 and the carcass is hung with its front quarter aligned above its hindquarter. The carcass can then be butchered by any applicable method. Preferably, the carcass is placed on a carcass holding device that includes spreading plates, such as the device disclosed in U.S. patent application Ser. No. 16/774,753.

Figure 7:
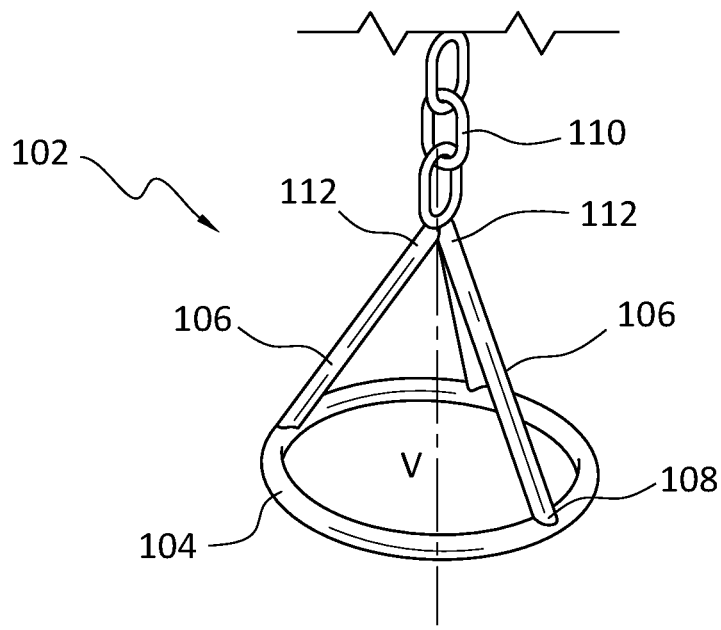
FIG. 7 is a perspective view of a second embodiment of a hanging device according to the present disclosure.

FIG. 7 shows an additional embodiment of the present disclosure. There is a carcass hanging device 102 which includes an annular base 104, three projections 106 connected in spaced relation with the base at projection lower ends 108, and a chain 110 connected with upper ends 112 of the projections. The upper ends 112 are connected to each other at a common point located on a vertical axis V of the annular base. The annular base of this embodiment has a circular configuration in a vertical cross section. It will be understood by those skilled in the art that the annular base could also have polygonal configurations in a vertical cross section without deviating from the purpose of the base.

Figure 8:
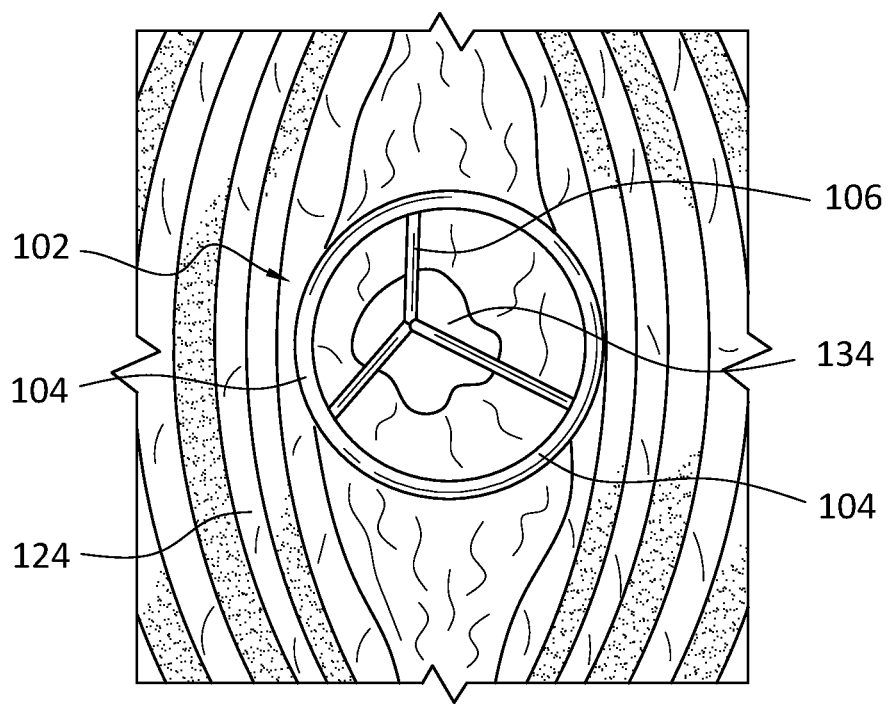
FIG. 8 is a bottom view of a central cavity of a beef carcass with the embodiment of FIG. 7 inserted into the carcass central cavity.

Referring now to FIG. 8, the device 102 of FIG. 7 is shown inserted into the central cavity 124 of a carcass. The annular base 104 is in contact with the sidewall of the central cavity, and the projections 106 extend toward and through the carcass front quarter opening 134. The carcass can then be hung as described in FIGS. 3 and 4 by connecting the chain 110 to a support structure.

Figure 9:
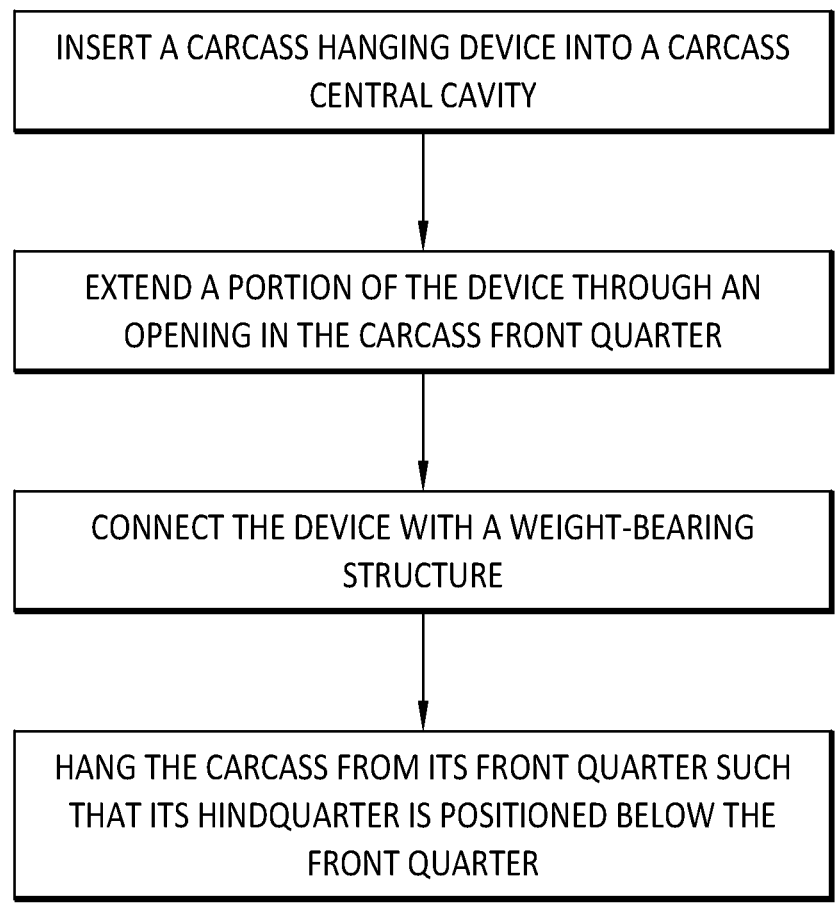
FIG. 9 is a flow chart of a method for hanging an animal carcass.

In addition to the above described device, the present disclosure also relates to a method for hanging an animal carcass. As shown in FIG. 9, the method includes the steps of providing a carcass hanging device, such as the one described above, attaching the device with the front quarter of a carcass, connecting the device with a structure, and hanging the carcass from its front quarter to position the front quarter above the carcass hindquarter. Once the method is complete, the carcass will hang from its front quarter as shown in FIG. 3.

Preferably, attaching the carcass hanging device is performed by inserting a hanging device into the central cavity of a carcass, extending a portion of the device through an opening in the front quarter of the carcass, and contacting a central cavity inner surface with a portion of the device to prevent the entire device from passing through the front quarter opening.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. An animal carcass hanging device, comprising:
   (a) a base having a vertical axis and a generally circular configuration in a horizontal cross section normal to said vertical axis;
   (b) at least one projection having a first end connected with said base and a second end extending from said base; and
   (c) a connection device connected with said at least one projection second end, whereby when said carcass hanging device is inserted into a central cavity of a carcass that contains an opening at its front quarter, said connection device extends through the opening, said base is in contact with a central cavity wall, and said connection device is connected with a structure to hang the carcass from its front quarter.

2. An animal carcass hanging device as defined in claim 1, wherein:
   (a) said base has an annular configuration and contains a central opening; and
   (b) said at least one projection comprises three projections having first ends connected in spaced relation with said base and second ends extending at an angle from said base toward a common location on said axis spaced from said base, wherein said base and said three projections form a generally cone-shaped configuration.

3. An animal carcass hanging device as defined in claim 2, said base having a circular configuration in a vertical cross section.

4. An animal carcass hanging device as defined in claim 2, wherein said connection device comprises a chain.

5. An animal carcass hanging device as defined in claim 1, wherein said base has an upper surface with which said at least one projection first end is connected, said projection width being less than a width of said base.

6. An animal carcass hanging device as defined in claim 5, and further comprising a chain connected with said connection device.

7. An animal carcass hanging device as defined in claim 5, wherein said projection comprises a generally cylindrical configuration having a uniform diameter.

8. An animal carcass hanging device as defined in claim 5, and further comprising at least one vertical support wall having a first edge connected with said base upper surface and a second edge connected with a surface of said projection.

9. An animal carcass hanging device as defined in claim 8, wherein said at least one vertical support wall has a generally triangular configuration.

10. A method for hanging an animal carcass, comprising the steps of:
   (a) removing the head of a carcass to produce a front quarter opening corresponding with a central cavity of the carcass;
   (b) providing a carcass hanging device including a base having a vertical axis and circular configuration in a horizontal cross section normal to said vertical axis and a projection extending from said base;

(c) attaching the device with a carcass front quarter, including the steps of:
- (1) inserting a hanging device into the central cavity of a carcass through a pelvic opening;
- (2) extending a portion of the device through the front quarter opening produced from removing the head of the carcass; and
- (3) contacting a central cavity inner surface with a portion of the device whereby the device is prevented from entirely passing through the front quarter opening;

(d) connecting the device with a weight-bearing structure; and (e) hanging the carcass from its front quarter to position the front quarter above the carcass hindquarter.

11. A method of hanging an animal carcass as defined in claim 10, wherein said extending step includes extending a portion of the device through the opening created when the head and neck of an animal carcass are removed.

12. A method for hanging an animal carcass as defined in claim 10, and further comprising the step of providing a carcass hanging device that includes a base having an upper surface and a projection connected with the upper surface at a first end, wherein a width of the projection is less than a width of the base.

* * * * *